(12) United States Patent
Lindoff et al.

(10) Patent No.: US 9,717,070 B2
(45) Date of Patent: Jul. 25, 2017

(54) DETERMINING TIMING OF FEEDBACK INFORMATION IN WIRELESS NETWORK REALISED IN DIFFERENT TECHNOLOGIES

(75) Inventors: Bengt Lindoff, Bjärred (SE); Stefan Parkvall, Stockholm (SE); Mats Sågfors, Kyrkslätt (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 747 days.

(21) Appl. No.: 14/003,964

(22) PCT Filed: Feb. 8, 2012

(86) PCT No.: PCT/EP2012/052137
§ 371 (c)(1),
(2), (4) Date: Sep. 9, 2013

(87) PCT Pub. No.: WO2012/123190
PCT Pub. Date: Sep. 20, 2012

(65) Prior Publication Data
US 2013/0343357 A1 Dec. 26, 2013

Related U.S. Application Data

(60) Provisional application No. 61/452,690, filed on Mar. 15, 2011.

(51) Int. Cl.
*H04W 72/04* (2009.01)
*H04L 1/18* (2006.01)

(52) U.S. Cl.
CPC .............. *H04W 72/04* (2013.01); *H04L 1/18* (2013.01)

(58) Field of Classification Search
None
See application file for complete search history.

(56) References Cited

U.S. PATENT DOCUMENTS

2009/0097466 A1* 4/2009 Lee .................. H04L 1/0081
370/344
2010/0135272 A1 6/2010 Dayal et al.
(Continued)

FOREIGN PATENT DOCUMENTS

| WO | 2010039011 A2 | 4/2010 |
| WO | 2011025816 A1 | 3/2011 |
| WO | WO 2011/025816 | * 3/2011 |

*Primary Examiner* — Ayaz Sheikh
*Assistant Examiner* — Sori Aga
(74) *Attorney, Agent, or Firm* — Coats & Bennett, PLLC

(57) ABSTRACT

The invention relates to a method in a user equipment 4 for determination of timing of a Hybrid Automatic Repeat re-Request, HARQ, response. The user equipment 4 operates in a communication network 1 comprising a primary radio access technology system 2 and a secondary radio access technology system 3. The user equipment 4 receives on at least one downlink carrier on the first radio access technology system 2 and on at least one downlink carrier on the second radio access technology system 3. The method comprises determining a downlink timing related to the secondary radio access technology system 3; determining a virtual uplink timing for HARQ response on the secondary radio access technology system 3 based on the downlink timing; determining an uplink timing related to the primary radio access technology system 2; and determining, based on the virtual uplink timing and the uplink timing for the primary radio access technology system 2, an uplink time instance for transmission of the HARQ response on an uplink carrier of the primary radio access technology system 2, wherein the HARQ response relates to data received on the downlink carrier on the secondary radio access technology system 3. The invention also relates to user equipment, radio base stations and methods therein.

12 Claims, 10 Drawing Sheets

(56) References Cited

U.S. PATENT DOCUMENTS

| | | |
|---|---|---|
| 2011/0044218 A1 | 2/2011 | Kaur et al. |
| 2011/0075611 A1* | 3/2011 | Choi ................... H04L 1/1819 370/329 |
| 2011/0090825 A1* | 4/2011 | Papasakellariou ........ H04L 1/06 370/280 |
| 2011/0158116 A1* | 6/2011 | Tenny ............... H04W 56/0045 370/252 |
| 2011/0194523 A1 | 8/2011 | Chung et al. |
| 2012/0069798 A1* | 3/2012 | Vitthaladevuni ......... H04L 1/02 370/328 |
| 2012/0093073 A1* | 4/2012 | Lunttila ............... H04L 1/1607 370/328 |

* cited by examiner

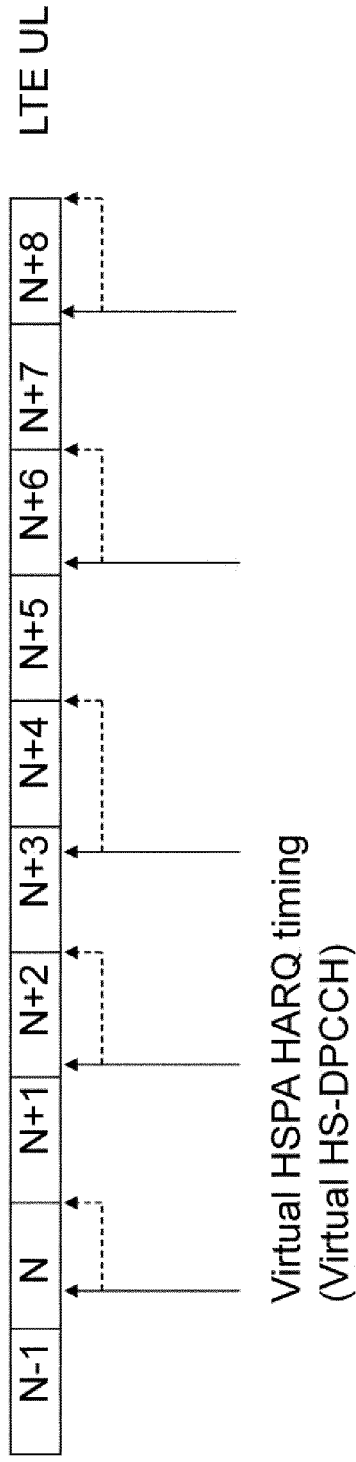
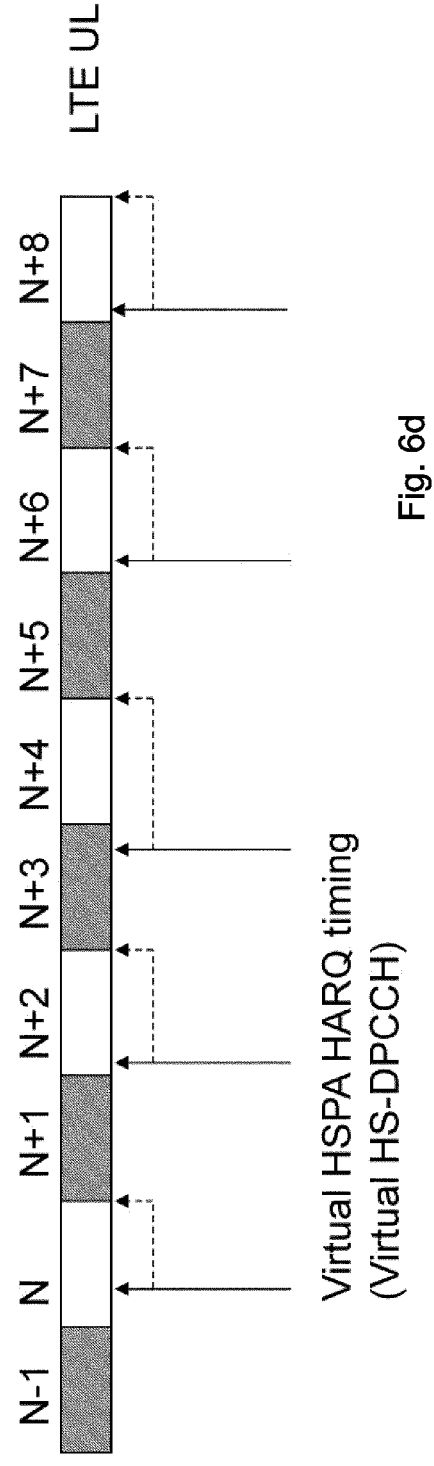
Fig. 6c
Fig. 6d

DETERMINING TIMING OF FEEDBACK INFORMATION IN WIRELESS NETWORK REALISED IN DIFFERENT TECHNOLOGIES

TECHNICAL FIELD

The technology disclosed herein relates generally to the field of wireless communication systems, and in particular to timing of feedback information in wireless communication systems using multiple radio access technologies.

BACKGROUND

Today, there are many radio/wireless and cellular access technologies and standards such as GSM/GPRS (Global System for Mobile Communications/General Packet Radio Service), WCDMA/HSPA (Wideband Code Division Multiple Access/High Speed Packet Access), CDMA-based technologies, WiFi (wireless fidelity), WiMAX (Worldwide Interoperability for Microwave Access) and recently LTE (Long Term Evolution), to name a few. The technologies and standards have been developed during the last few decades, and it can be expected that the development will continue. Specifications are developed in organizations like 3GPP, 3GPP2 and IEEE.

Various frequency bands are typically allocated and/or sold by government organizations, such that an operator may "own" certain bands for a particular use (i.e. the right to use the band in a certain way). Regulations may specify that the owner, i.e. the operator, should deploy a particular technology in a particular frequency band. In some cases, the operator may be able to choose what technology and standard to deploy in their spectrum provided the choices fulfill certain criteria set up by e.g. the ITU (International Telecommunications Union).

As a consequence of the fact that spectrum is a scarce resource, an operator may have the rights to deploy a new cellular access, such as LTE, in a limited spectrum of, say 20 MHz.

However, the fact that the operator may have an existing customer base with existing terminals will prevent the operator from deploying only one technology in the whole spectrum owned by the operator. This could be the case e.g. for an operator that has a large customer base with WCDMA/HSPA subscriptions using the UTRAN network, and the operator wants to deploy the most recent evolution, the Long Term Evolution (LTE) of UTRAN, also called E-UTRAN.

In this example, the operator may then have to divide the available bands between HSPA and LTE. At initial deployment of LTE, the operator may thus continue to use e.g. 10 MHz (corresponding to two WCDMA carriers) with HSPA and reserve 10 MHz for initial LTE deployment.

However, such partitioning the scarce spectrum to different technologies has some undesired effects on performance:

There is a direct correlation between the peak-rate that can be offered and the spectrum width that is used. Thus, limiting the bandwidth of both HSPA and LTE to 10 MHz in the example above will roughly limit the peak-rate offered to customers to a half.

Thus, assuming now, for the sake of illustration, that the technologies can offer around 100 Mbps in 20 MHz, it will mean that the peak-rate will now be limited to around 50 Mbps in each of the technologies.

Initially, it may happen that the HSPA carriers are very loaded, while the LTE carriers in the example only have a few users. Thus, there would be an imbalance between allocation and use resulting in undesired congestion on the HSPA carriers. However, in order to offer a decent bit-rate on the LTE carriers, it is still not possible to allocate e.g. only 5 MHz to LTE customers, since then the LTE evolution would not provide competitive performance in relation to HSPA.

There have been discussions to find a solution for simultaneous use of multiple radio access technologies (LTE+HSPA carrier aggregation), such that higher peak rates and load balancing can be offered in heterogeneous deployments including at least two radio access technologies. Carrier aggregation, wherein a combination or an aggregation of two independent carriers is made, is one way of achieving increased resource utilization and spectrum efficiently.

For example, in LTE+HSPA carrier aggregation each carrier is an LTE carrier or a HSPA carrier. Both LTE carrier aggregation as well as HS carrier aggregation, i.e. carrier aggregation within the same RAT, is defined in the 3GPP specifications. Dual-carrier HSPA was first introduced in Release 8, and LTE carrier aggregation was introduced in Release 10 standard of the 3GPP specification.

SUMMARY

For e.g. LTE+HSPA carrier aggregation one possibility is that a mobile terminal or user equipment (UE) is in connection to a primary serving cell on a primary/first radio access technology (RAT) (for instance HSPA) on a first carrier and a secondary/second serving cell on a second RAT (for instance LTE) on a second carrier, i.e. in a similar way as primary and secondary cell are defined on intra RAT (LTE or HSPA) carrier aggregation. It is possible that one of the RATS and systems is considered as being the one in control of the UE, while the carrier or carriers on the other system (or RAT) is considered as a performance "booster", in the sense that such "secondary" carriers are added to enhance the performance. For example, UTRAN could be the primary system/RAT, while eUTRAN may be the secondary system/RAT. In a possible configuration situation, it could happen e.g. that a UE is first connected to UTRAN, and then later, the UE is configured to add carriers on LTE. LTE is then a secondary RAT, i.e. the connection control remains in UTRAN, even if some LTE carriers or cells are added to "boost" the performance. Of course, it is possible to envision the configuration such that LTE acts as the primary system/RAT, and UTRAN/HSPA is the secondary system/RAT.

In some scenarios one can expect that the carrier aggregation is made only in the downlink (DL), and hence a single RAT (typically corresponding to the primary RAT) is used in the UL. Carrier aggregation in the downlink may be easier to implement, as there is no requirement for a UE to transmit on multiple carriers using different technologies. It may also be anticipated that carrier aggregation in the downlink is more urgent, in case the traffic load is biased towards downlink data traffic (as opposed to uplink data traffic dominance).

However, introducing DL carrier aggregation would also introduce a new set of problems, since there is some control information, or feedback information, related to the downlink data information that needs to be transmitted on the uplink carrier. Thus, if there is no uplink carrier configured with one of the access technologies, there is currently no method for how to transmit the control information associated with that radio access technology (RAT).

In this case feedback information, like acknowledgment/negative acknowledgment (ACK/NAK) signaling and channel quality indicator (CQI) reports for the secondary RAT, may need to be reported using the primary RAT UL (assuming here, that the secondary RAT is not configured with any UL).

HARQ ACK/NAK stands for Hybrid ARQ acknowledgements (ACK) and negative acknowledgements (NAK). HARQ with ACK/NACKs are implemented both in HSPA and LTE, using binary feedback related to the successful or non-successful reception of a related data unit (transport block). This is known in the art, and HARQ and ACK/NAK will not be described in a very detailed fashion here.

CQI stands for Channel Quality Indicator and is a quality parameter describing the estimated quality of the downlink channel, such that the downlink transmitter (Radio Base station, RBS) can decide e.g. what coding, modulation, power or frequency to use in an upcoming transmission. The UE monitors the downlink channel quality, and reports a CQI parameter to the network. Both HSPA and LTE implements CQI, though there are differences in the way CQI can be configured, and what information the report may contain.

Since different RATs have different sub frame timings and HARQ response timing requirements, the ACK/NAK reports cannot be immediately applied and transmitted in the UL.

Due to the different timing requirements as well as different transmission time intervals (TTI) (sub frame) length in different RATS there is therefore a need for methods and apparatuses for determination of timing of HARQ response transmitted on an UL of a primary RAT related to DL data received on a secondary RAT.

In a UE, there is thus a need to convey feedback information on a primary RAT uplink, where the feedback information is related to the downlink (DL) reception on the secondary RAT. The present disclosure provides a solution to this, and particularly, a solution for the timing of the ACK/NAK feedback.

An object of the invention is to overcome or at least alleviate one or more of the above mentioned problems.

The object is, according to a first aspect of the invention, achieved by a method in a user equipment for determination of timing of a Hybrid Automatic Repeat re-Request, HARQ, response. The user equipment operates in a communication network comprising a primary radio access technology system and a secondary radio access technology system. The user equipment receives data, data information or data packets on at least one downlink carrier on the first radio access technology system and on at least one downlink carrier on the second radio access technology system. The method comprises determining a downlink timing related to the secondary radio access technology system; determining a virtual uplink timing for HARQ response on the secondary radio access technology system based on the downlink timing; determining an uplink timing related to the primary radio access technology system; and determining, based on the virtual uplink timing and the uplink timing for the primary radio access technology system, an uplink time instance for transmission of the HARQ response on an uplink carrier of the primary radio access technology system, wherein the HARQ response relates to data received on the downlink carrier on the secondary radio access technology system.

In an embodiment, the determining of an uplink time instance for transmission of the HARQ response comprises mapping the virtual uplink timing to the uplink timing for the primary radio access technology system.

In a variation of the above embodiment, the determining of an uplink time instance for transmission of the HARQ response comprises mapping to the next uplink time instance of the primary radio access technology system following the virtual uplink timing.

In an embodiment, HARQ responses relating to two consecutive data packets are bundled onto one time instance for transmission on the uplink carrier of the primary radio access technology system.

In a variation of the above embodiment, the HARQ response is transmitted only if both data packets are correctly decoded.

In another variation of the embodiment, the HARQ response is transmitted using a quadrature phase-shift keying, QPSK, constellation, where two points corresponding to one dimension is the HARQ response for one of the data packets and the other dimension is the HARQ response for the other data packet.

In an embodiment, the method comprises switching the uplink time instance for transmission of the HARQ response to an earlier or delayed time instance if a relation between the virtual uplink timing and the uplink timing of the primary system has drifted by more than a threshold value.

In an embodiment, the method comprises applying a sequence of timings for HARQ responses for timing drifts less than a threshold value.

The object is, according to a second aspect of the invention, achieved by a user equipment configured to operate in a communication network comprising a primary radio access technology system and a secondary radio access technology system. The user equipment is configured to receive data, data information or data packets, on at least one downlink carrier on the first radio access technology system and at least one downlink carrier on the second radio access technology system. The user equipment is configured to determine a downlink timing related to the secondary radio access technology system; determine a virtual uplink timing for Hybrid Automatic Repeat re-Request, HARQ, response, HARQ response on the secondary radio access technology system based on the downlink timing; determine an uplink timing related to the primary radio access technology system; and determine, based on the virtual uplink timing and the uplink timing for the primary radio access technology system, an uplink time instance for transmission of the HARQ response on the uplink carrier of the primary radio access technology system, wherein the HARQ response relates to data received on the downlink carrier on the secondary radio access technology system.

In an embodiment, the user equipment is configured to determine an uplink time instance for transmission of the HARQ response by mapping the virtual uplink timing to the uplink timing for the primary radio access technology system.

In an embodiment, the user equipment is configured to determine an uplink time instance for transmission of the HARQ response by mapping the virtual uplink timing to the next uplink time instance of the primary radio access technology system following the virtual uplink timing.

In an embodiment, the user equipment is configured to bundle HARQ responses relating to two consecutive data packets onto one time instance for transmission on the uplink carrier of the primary radio access technology system.

In a variation of the above embodiment, the user equipment is configured to transmit the HARQ response only if both data packets are correctly decoded.

In another variation, the user equipment is configured to transmit the HARQ response using a quadrature phase-shift keying, QPSK, constellation, where two points corresponding to one dimension is the HARQ response for one of the data packets and the other dimension is the HARQ response for the other data packet.

In an embodiment, the user equipment is configured to switch the uplink time instance for transmission of the HARQ response to an earlier or delayed time instance if a relation between the virtual uplink timing and the uplink timing of the primary system has drifted by more than a threshold value.

In an embodiment, the user equipment is configured to apply a sequence of timings for HARQ responses for timing drifts less than a threshold value.

The object is, according to a third aspect of the invention, achieved by a method in a radio base station node of a communication network comprising a primary radio access technology system and a secondary radio access technology system. The radio base station node is arranged for communication with a user equipment using the primary radio access technology system. The method comprises detecting feedback information associated with the secondary radio access technology system; and conveying the feedback information to a component of the secondary radio access technology system.

The object is, according to a fourth aspect of the invention, achieved by a radio base station node of a communication network, the communication network comprising a primary radio access technology system and a secondary radio access technology system. The radio base station node is arranged for communication with a user equipment using the primary radio access technology system. The radio base station node is arranged to detect feedback information associated with the secondary radio access technology system; and convey the feedback information to a component of the secondary radio access technology system.

Further features and advantages of the invention will become clear upon reading the following description and the accompanying drawings.

BRIEF DESCRIPTION OF THE DRAWINGS

FIG. 6c illustrates another hysteresis aspect.

FIG. 6d illustrates a timing aspect.

DETAILED DESCRIPTION

Figure 1:
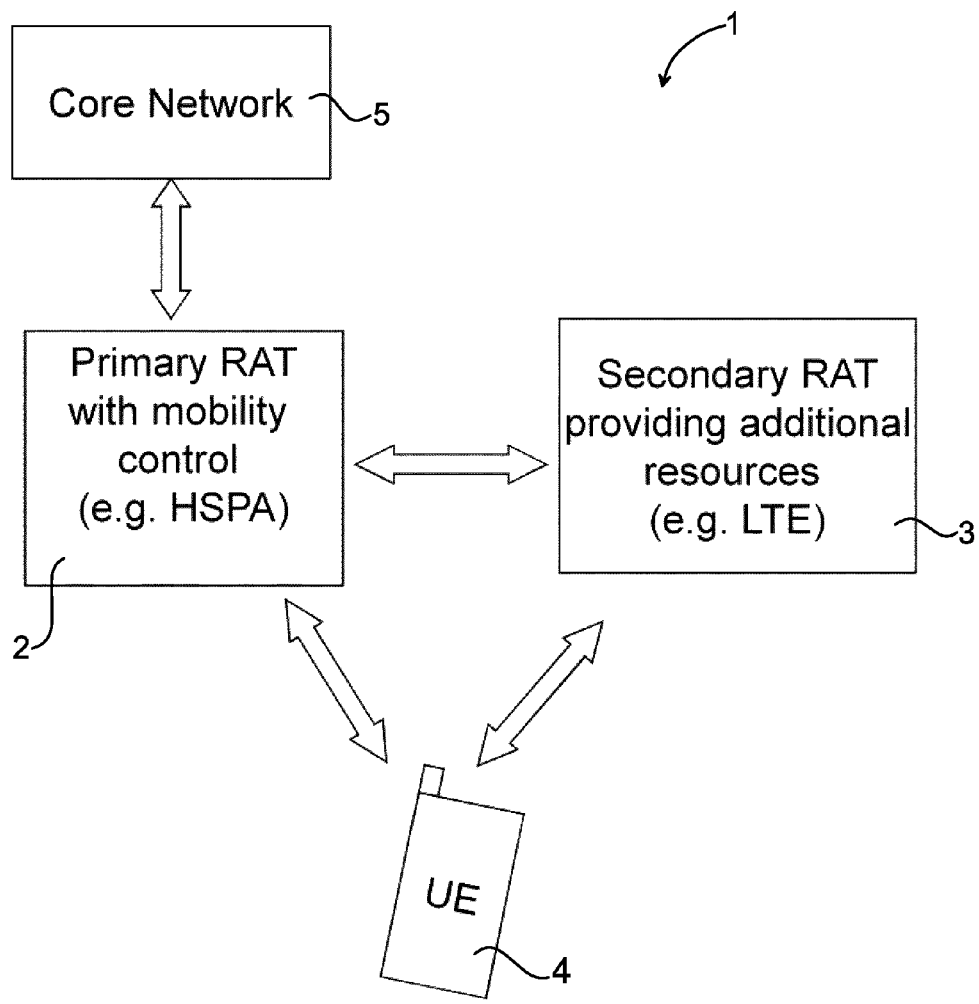
FIG. 1 exemplifies aggregation with a primary system and secondary system.

In the following description, for purposes of explanation and not any limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

3GPP is responsible for the development and maintenance of GSM/GPRS, WCDMA/HSPA and LTE standards. In this disclosure, primary focus is on the HSPA-evolution built on the WCDMA radio access also called Universal Terrestrial Radio Access Network (UTRAN), and LTE, which is based on OFDM and SC-FDMA, also recognized as the Long Term Evolution of UTRAN, or evolved UTRAN (E-UTRAN). Detailed UTRAN radio access specifications are described in the 25-series of 3GPP specifications, while E-UTRAN specifications are found in the 36-series. LTE was introduced in 3GPP Release 8, but the development and future evolution of both HSPA and LTE continues in parallel in Release 9, 10 and so on.

Regarding the carrier aggregation set-up, examples of which were given earlier, various possible future scenarios apply, and should not be seen as limiting the applicability of embodiments of the present invention. In FIG. 1, for the sake of illustration, one possible solution is outlined where HSPA is acting as the primary system and RAT 2 and LTE is the secondary system and RAT 3. In such a situation, it is possible that e.g. mobility is controlled by the primary system and RAT, as further described below. A communication system 1 or communication network thus comprises the primary radio access technology system 2 and the secondary radio access technology system 3. Further, a user equipment 4 receives on at least one downlink carrier on the first radio access technology system 2 and on at least one downlink carrier on the second radio access technology system 3. In the FIG. 1, the communication system 1 is illustrated to comprise also a core network 5, associated with the primary RAT 2.

It is noted that the present invention is not limited to these exemplary technologies, but the embodiments of the invention is equally applicable to any combination of radio access technologies, as will be further explained below. For example, the RATs may comprise LTE and WLAN or HSPA and WLAN or any other radio access technologies.

As mentioned earlier, different RATs have different sub frame timings and HARQ response timing requirements, therefore the ACK/NAK reports cannot be immediately applied and transmitted in the UL. That is, it is not straight-forward to start sending ACK/NACKs related to the secondary radio access technology and the reception of data packets on the secondary downlink carrier on the uplink carrier on the first or primary radio access technology.

Figure 2:
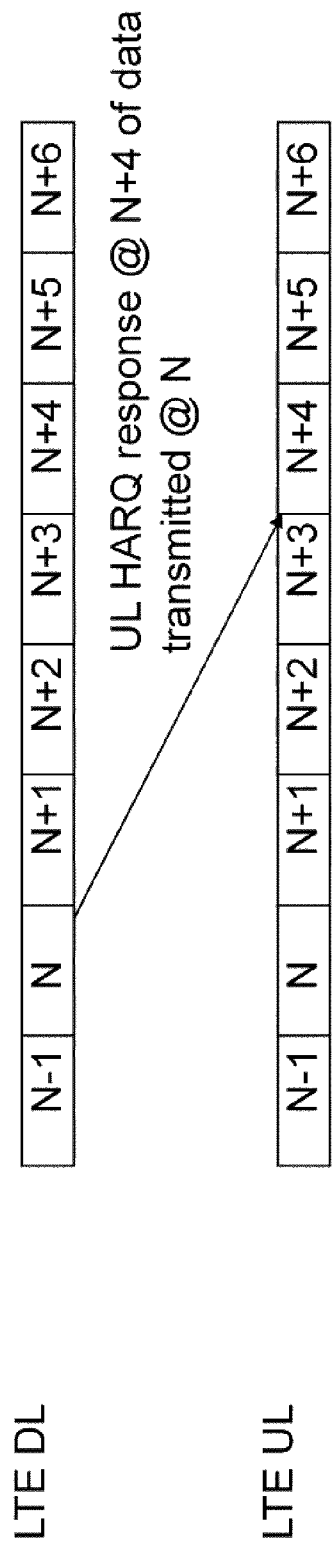
FIG. 2 illustrates uplink HARQ timing in LTE, in particular frequency division duplex.

For instance, in LTE, which uses 1 ms sub frames, the UE 4, in frequency division duplex (FDD), should transmit the HARQ response of DL data received at sub frame N in the UL sub frame at a time instance N+4, see FIG. 2, wherein uplink HARQ timing in LTE, in particular frequency division duplex, is illustrated. That is, from the reception of subframe N, the UE 4 has three full subframes of time to process the reception, before the feedback on the successfulness or non-successfulness of the reception of the data packets should be ready.

Figure 3:
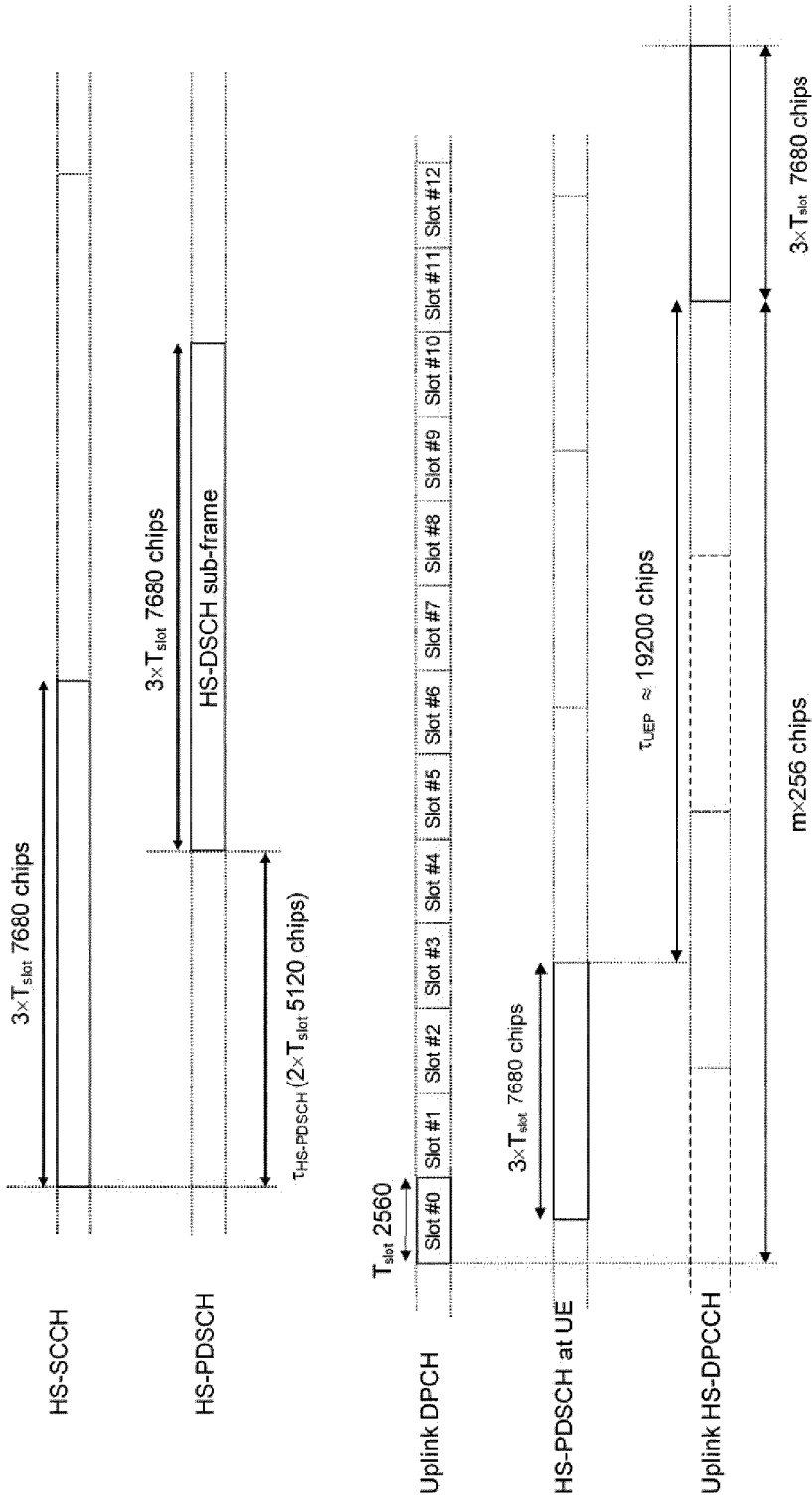
FIG. 3 illustrates timing relationship for a downlink channel and corresponding uplink channel comprising HARQ information.

However in HSPA, the exact timing is based on the terminal/UE DPCCH timing, but is approximately 19200 chips (5 ms) after the end of the HS-PDSCH sub frame, as shown in FIG. 3. In particular, FIG. 3 illustrates a timing relationship for HS-SSCH/HS-PDSCH (which is a DL channel) and corresponding HS-DPCCH (which is an UL channel) containing HARQ information (ACK/NACK response).

Due to the different timing requirements as well as different transmission time interval (TTI), or sub frame, length in different RATS there is a need for methods and apparatus for determination of timing of HARQ response transmitted on an UL of a primary RAT related to DL data received on a secondary RAT.

It should here be understood that HARQ response related to DL data refers to the HARQ ACK/NACK feedback, i.e. the logical information related to the successfulness or non-successfulness of the reception (i.e. successful decoding of a transport block. In the UE 4, there is thus a need to convey this information related to the DL reception on the secondary RAT 3 on an uplink (UL) direction in the primary RAT 2. Embodiments of the present invention provide solutions to this problem, and particularly a solution for the timing of the ACK/NAK feedback.

The basic concept of embodiments of the present invention is to provide a solution to the earlier mentioned problems. Briefly, the basic principle is that the terminal or user equipment (UE) 4 derives the HARQ response timing for the secondary RAT 3 based on the rules and specification of the secondary RAT 3, and then determines a virtual secondary RAT HARQ timing. Then the virtual timing is mapped to the timing used for the uplink (UL) carrier in the primary RAT 2. Different mapping rules can be envisioned. In one embodiment the mapping could be to the next UL sub frame (after the virtual timing point) for the primary RAT. In another embodiment, in order to determine the UL timing of the primary RAT, the virtual timing is rounded to the closest UL sub frame timing of the primary RAT 2.

Figure 4:
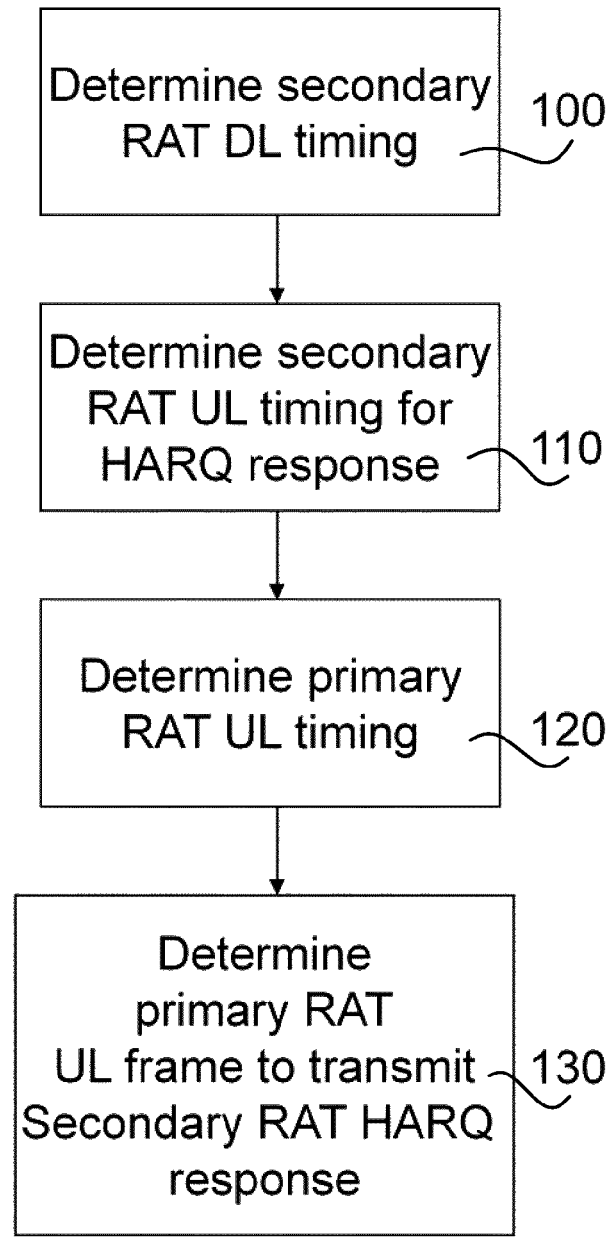
FIG. 4 is a flow chart of methods implemented in a user equipment.

FIG. 4 shows a flow chart of an embodiment of the methods, implemented in a user equipment 4, disclosed herein. The UE 4 is in connected mode with the communication network 1 and is configured to operate in a multi RAT carrier aggregation environment, with a primary RAT 2 and secondary RAT 3 in the downlink (DL) and with a primary RAT in the UL.

In order to determine the timing used for UL transmission of secondary RAT HARQ response (ACK/NAK feedback) the following procedure is used.

First, in step 100, the UE 4 determines the DL timing of the secondary RAT 3. This is may be done by determination of DL timing (from synchronization and pilot symbols/channels) as well as from network configuration parameters, known in the art, for the secondary RAT. For instance, in case the secondary RAT 3 is HSPA (i.e. UTRAN), the primary and secondary synchronization signal and the common pilot channel (CPICH) is used, in combination with network information received for DL Dedicated Physical Control Channel (DPCCH) timing for determination of the DL timing. Based on the DL timing and the specification requirements for the secondary RAT 3, the UL timing or a virtual UL timing for the HARQ response is determined (step 110). In step 120, the UE 4 then determines, or it determines in parallel to steps 100, and 110, the UL timing for the primary RAT 2, typically derived from the primary RAT DL timing (also determined in the UE 4 according to known principles). The steps 100, 110 and 120 may be implemented sequentially or concurrently, i.e. in arbitrary order.

Finally based on the virtual timing of the UL HARQ response derived for the secondary RAT 3, and the UL timing of the primary RAT 2, the UL frame used for transmission of the HARQ response is determined (130).

It is noted that the timing of the two (or more) carriers implementing the two radio access technologies may be unsynchronized, i.e. the timing of frames, subframes or slots may not be aligned. Further, since the RAT systems may implement separate clocks or references for their respective clocks, then it could happen that the alignment between the frames, subframes or slots of the two RAT systems drift relative to each other. There is therefore a need for the solution provided in the present disclosure, where the frame, subframe or slot for transmission of ACK/NACK feedback on the uplink on a first UL is determined in a deterministic way. That is, it is important that both the UL transmitter (in the UE) and UL receiver (in the network node such as a base station in the network) can unambiguously know where to transmit feedback (for example to the UE), and from where to expect feedback information. The embodiments in the present disclosure provide this, regardless of any drift or offset in timing between slots, frames or subframes of the two systems.

Figure 5:
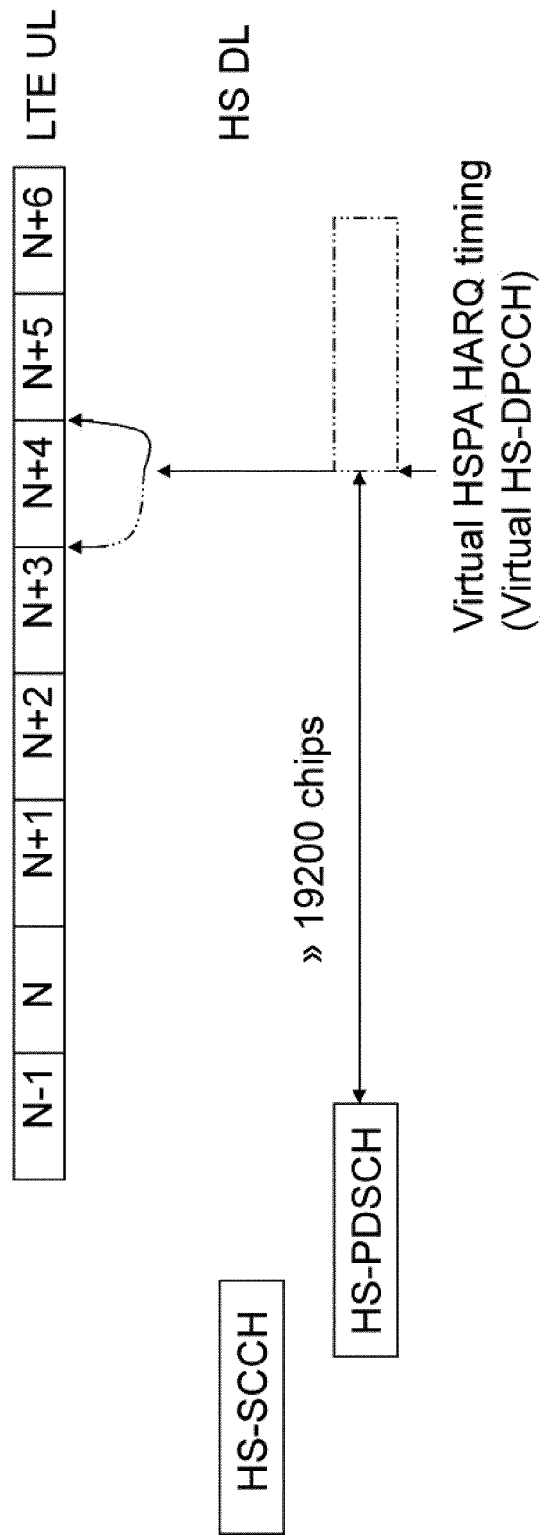
FIG. 5 illustrates a timing aspect when LTE is primary radio access technology.

FIG. 5 shows the principles of an embodiment of the invention in case LTE is the primary RAT and HSPA is the secondary RAT. The timing for HARQ response is around 19200 chips (5 ms) from the end of the HS-physical downlink shared channel (PDSCH) TTI. The HS-PDSCH carries the transport block or data packet that should be acknowledged or negatively acknowledged. As can be noted the response time is larger for HSPA than for LTE. In this case the virtual HS-DPCCH timing for ACK/NAK response is determined and then mapped to the LTE UL sub frame timings. That is, the UE 4 determines the transmission time of the ACK/NAK according to the requirements of the secondary system (HSPA in this example), as if the UE would have an HS-DPCCH uplink channel available on the secondary system for transmission of the ACK/NAK feedback. Since this is not the case, the UE will then use, according to the present disclosure, this virtual transmission timing for transmission of the feedback on uplink of the primary system.

Now, there may not be a slot available in the primary RAT system 2 exactly at the virtual transmission timing, since the timing of the two RAT systems 2, 3 may be equipped with an offset.

In one embodiment the timing is rounded to the next UL LTE sub frame. In this solution, the UE 4 checks the virtual transmission time for transmission of ACK/NAK feedback, and transmits this feedback starting at the next time-slot, as shown in FIG. 5. This is illustrated with the arrow pointing towards the middle of the "N+4" subframe (virtual transmission time) and the UE now transmits in subframe N+5, i.e. at the next fully available UL LTE subframe.

Alternatively, one can also envision the case that the timing is rounded to the closest LTE UL sub frame timing. In this case, if the beginning of subframe "N+4" is closer that "N+5" of the virtual transmission time, then the transmission time of the ACK/NAK feedback is at "N+4", as illustrated with the dashed arrow in FIG. 5.

In yet another embodiment, it may be possible to use the current subframe corresponding to the virtual transmission time (i.e. to a value smaller than the virtual HS-DPCCH UL timing). This may be possible by tightening the processing requirements on the secondary system, in this case HSPA. Also, since the UE anyway can decode LTE transport blocks (which are larger than corresponding transport blocks in HSPA) in a shorter time (4 ms) the UE may have the possiblity to decode HSPA transport blocks in a shorter time frame than the HSPA specification requirement 5 ms.

Figure 6:
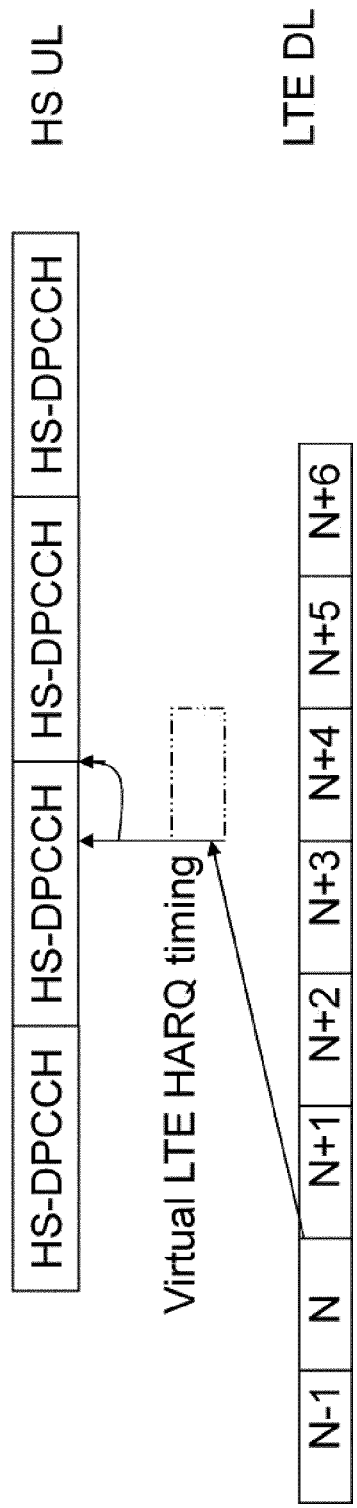
FIG. 6 illustrates a timing aspect when HSPA is primary radio access technology.

FIG. 6 shows the principles of an embodiment of the invention in case HSPA is the primary RAT. The same embodiments described in conjunction with FIG. 5 also apply here, and FIG. 6 is mainly introduced to illustrate that the method is applicable independently of what technologies are used for primary and secondary RATs. Since the primary RAT 2 here has longer timing requirements than the secondary RAT 3 in this case, the UE 4 might not have the possibility to decode the transport blocks faster than in the requirements for the secondary RAT 3. Therefore, a typical embodiment is to round the virtual timing towards the forthcoming (or next) primary RAT timing. Of course, also the other embodiments may be applied, given that the processing requirements could be fulfilled.

Yet another observation related to FIG. 6 can be made. Since LTE applies a Transmission Time Interval TTI, or subframe structure of 1 millisecond, which is the length of each data packet, but the feedback channel on HSPA (HS-DPCCH) has a duration of 2 milliseconds, corresponding to the length of two LTE data packets, it is necessary to bundle the logical ACK/NAK feedback from LTE onto one HS-DPCCH time-slot. For example, and in the illustration, feedback from N−1 and N would be sent in the same HS-DPCCH. Various techniques for sending this information are anticipated. One solution is to transmit ACK only if both data packets are correctly decoded. Such solution gives rise to retransmission of either no or two data packets. In another solution a 4-point (QPSK) constellation is used for transmission of ACK/NAK, where the two points corresponding to one dimension is ACK/NAK for the packet N−1, while the other dimension representing packet N. In yet another solution, the spreading factor used for HS_DPCCH is divided by two (compared to the original used), and hence the first half of the time the ACK/NAK feedback for packet N−1 is transmitted and the second half is used for the packet N.

Another issue has also been identified by the inventors of the present invention, related to the timing of ACK/NAK feedback on the primary RAT system 2, in case the frame or subframe, slot, timing between the two RAT systems 2, 3 drift. Then, it could happen that with the embodiments provided above, there could be an undesired "toggling" in the feedback timing, in case the virtual time instance derived according to the embodiments described herein happens to coincide closely with the border of two slots, and the determination of the subframe on the primary RAT system 2 results in a "toggling" of the subframe for where to send the ACK/NACK feedback.

Figure 6A:
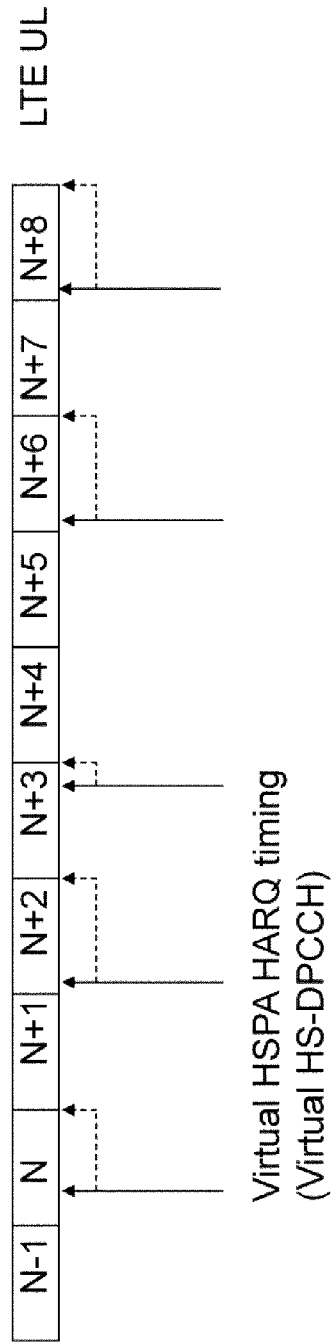
FIG. 6a illustrates a timing aspect between two systems.

This is illustrated in FIG. 6a, where a solution in which the embodiment of using the subframe following (i.e. the next after) the virtual transmission time is used. As can be seen, the virtual timing instance from HSPA occurs approximately every 2 millisecond. In the illustrated case, the determination results in ACK/NAK feedback in LTE subframes N+1 and N+3. However, since there is now a slight drift in the clocks of the two systems, or due to inaccuracy in the clocks in the UE (exaggerated in the figure), it now happens that the third illustrated virtual transmission timing results in ACK/NAK feedback in LTE subframe N+4. Then, there is again a drift forward in the fourth virtual time, resulting in HSPA ACK/NAK feedback in LTE subframe N+7. Such an irregular sequence (i.e. N+1, N+3, N+4, N+7, N+9, . . . ) is clearly not desirable, as it will complicate the process in the receiver of the ACK/NACK feedback to actually deduce where to expect the ACK/NAK feedback.

Figure 6B:
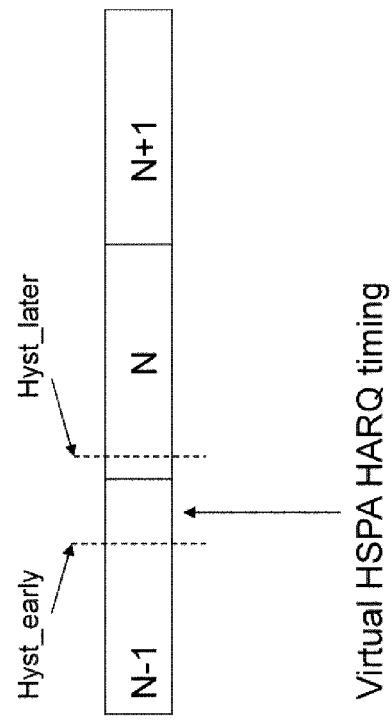
FIG. 6b illustrates a hysteresis aspect.

In order to solve this toggling problem, and according to yet another embodiment, there is introduced at least one hysteresis value by which the aforementioned toggling of the ACK/NAK timing can be avoided or at least reduced. This solution is illustrated in FIG. 6b. In particular, FIG. 6b illustrates the introduction of hysteresis values to handle timing drifts between the system timings. Here, a solution is illustrated where two hysteresis values or thresholds are configured.

A UE 4 first determines a subframe for transmission of ACK/NAK feedback according to any of the embodiments described herein. As observed in FIG. 6a, this should result in a controlled sequence of timings for ACK/NAK feedback, e.g. N−1, N+1, N+3, and so on. Now, the UE 4 shall apply this regular pattern, unless the timing drifts by more than the hysteresis values Hyst_early or Hyst_later, as now will be further described. For example, if the determination result would reveal that the UE 4 should not "switch" to an earlier subframe (i.e. e.g. N−1, N+1, N+3, N+4, N+6, N+8 . . . ) as partly illustrated in FIG. 6a, then the UE 4 should do so only if the drift in timing exceeds the threshold or hysteresis value Hyst_early. Similarly, the UE 4 should only switch to a delayed pattern (e.g. N−1, N+1, N+3, N+6, N+8, . . . not illustrated here) if the drift exceeds a hysteresis value Hyst_later. The two hysteresis values could have the same value, i.e. they could be implemented using a single hysteresis. The hysteresis could be hard-coded, or possibly configured by upper layers, e.g. the radio resource control (RRC) protocol of the primary RAT system 2.

By this solution it is possible to achieve a well defined pattern for the transmission of AC/NAK feedback also in the event of small timing drifts or uncertainties. The result for the problem example in FIG. 6a is shown in FIG. 6c, wherein a regular ACK/NACK feedback timing is ensured despite some clock drift. As can be seen, the drift in timing related to the third virtual timing will not result in any irregularity in the ACK/NAK feedback, since the drift did obviously not exceed the threshold. On the other hand, if the drift indeed exceeds the thresholds mentioned, then there is indeed a need to adjust the timing in order of the UE 4 to be able to comply with the processing requirements and related timing. An example of this could be N−1, N+1, N+3, N+6, N+8, N+10, . . . i.e. the UE 4 determined that the drift exceeded Hyst_later, and an adjustment of the feedback slots is made.

Another solution to eliminate or reduce the need for timing adjustment due to e.g. clock drift is provided below. An observation is made that HSPA has a 2 millisecond transmission time interval, while LTE has a 1 millisecond TTI (i.e. subframe structure). According to yet another embodiment, the communication network 1 may now configure that only every second LTE subframe (TTI) is available for ACK/NAK feedback from HSPA downlink transmissions. Following the fact that only every second LTE TTI is available for HARQ feedback information for HSPA, it reduces the need to adjust the feedback timing by the UE 4. This is illustrated in FIG. 6d. In particular, FIG. 6d illustrates that only every second TTI is configured for conveying HSPA HARQ feedback over the LTE uplink. TTIs N−1, N+1, N+3, . . . are configured and enabled for HSPA HARQ feedback (hatched in the figure).

This solution could be used independently, or together with the hysteresis embodiment described above, and together with any of the embodiments characterizing how to determine the HARQ feedback timing in the primary system from the virtual time instance.

Furthermore, an embodiment for handling timing drift between a primary serving cell on a first RAT (using a first carrier frequency) and a secondary serving cell on a secondary RAT (using a second carrier frequency) for transmitting feedback response like HARQ ACK/NAK (or CQI reports) could also be applicable to Multi carrier LTE or Dual Cell HSPA, in case the component carriers originated from different transmission nodes, or on significantly different carrier frequencies. In case the primary and secondary RATS are the same RAT, the virtual timing is determined as above, and then the hysteresis as described above are applied.

Figure 7:
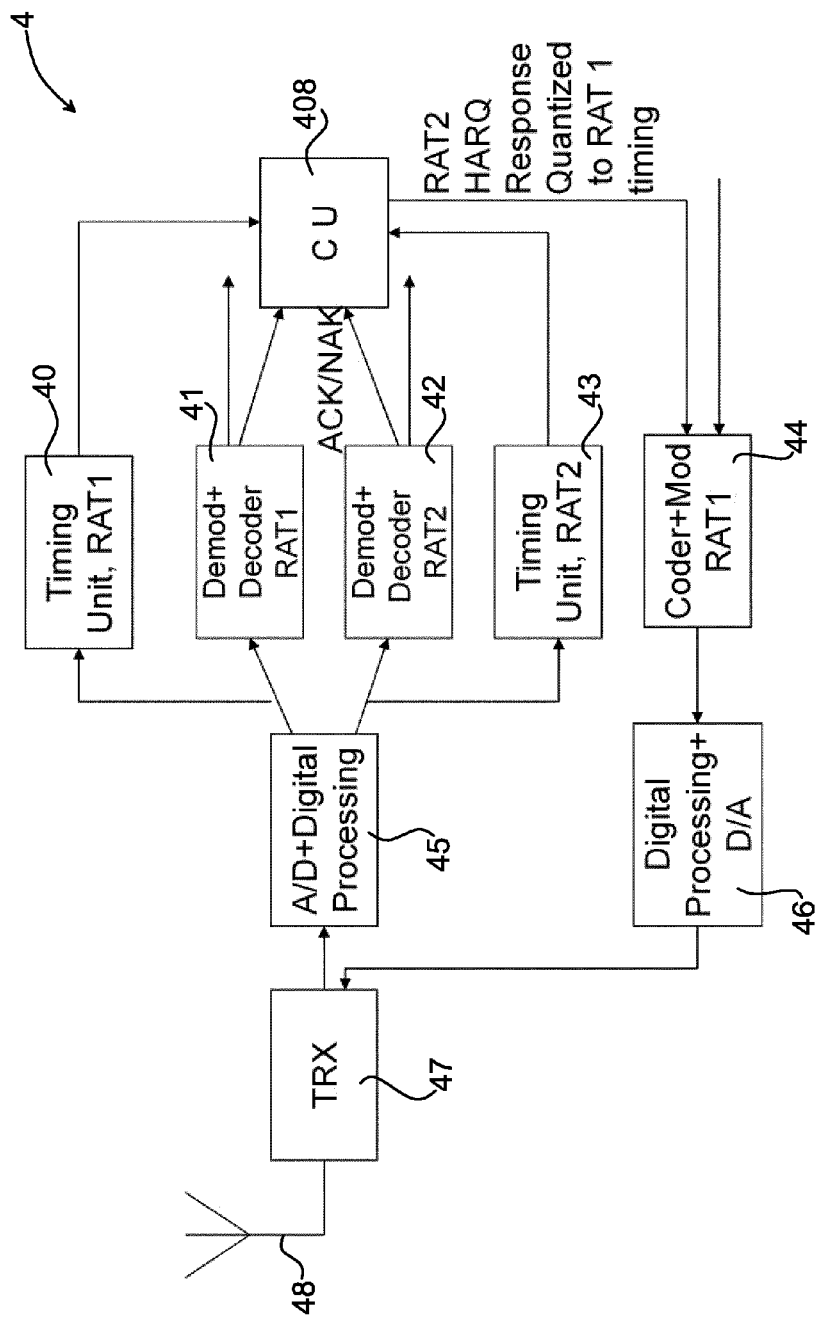
FIG. 7 illustrates a user equipment comprising functional blocks or means for implementing the methods.

FIG. 7 shows a block diagram of a UE 4 operating according to the presented disclosure, the illustrated UE comprising functional blocks or means for implementing the methods. The UE 4 comprises a transceiver unit (TRX) 47 responsible for translating the radio signal to a baseband signal (and vice versa), a A/D and D/A unit 45 responsible to transforming a analog(digital) signal to a digital(analog) signal. The UE 4 also comprises demodulators and decoders for respective supported RAT 41, 42 and the UE 4 is capable to operate these demodulators and decoders simultaneously. The UE 4 further comprises timing determination units 40, 43 capable of determining the DL timing for respective RAT, and a control unit 408 that is responsible for mapping the HARQ feedback response for the secondary RAT 3 to correct UL sub frame of the primary RAT 2 according to the embodiments described. Also blocks including coders and modulators 44 for the at least the primary RAT 2 is included in the UE 4.

While the embodiments of the present invention has been described under an assumption that there is one DL carrier on the primary radio access technology and another DL carrier on the secondary radio access technology, it should be understood that there may be multiple such carriers using both technologies. Constraining the description to one on each system/RAT is just to retain clarity and simplicity in the description of the main embodiments of the invention. For example, there may be 2 times 5 MHz on DL HSPA and 2 times 10 MHz DL LTE. In this case, one would thus have a UE receiving on 4 carriers at the same time. Similarly, there could be multiple UL carriers related to the primary system, for example such that there are 2 times 10 MHz in the UL on LTE. The UL could also be implemented using TDD, i.e. the carrier available for the UL would be the same as the one for the DL. If there are many UL carriers available for the UE, a plausible solution according to this disclosure is that one of the UL carriers of the primary system is used for conveying the HARQ feedback information related to the secondary system. Alternatively, multiple UL carriers of the primary system could be used for conveying the HARQ information of the secondary system, still implementing the methods described here, i.e. the methods related to the transmission and timing of HARQ information related to a secondary system onto the uplink or uplinks of a first or primary system.

It is also noted that the terms frame, subframe, slot or TTI (transmission time interval) may be interchangeable depending on the context and the words commonly used when describing each of the technologies. In essence, these terms describe the time-instance or duration in time during which some information may be transmitted between a transmitter and receiver. It is a way of dividing time into separate, well defined durations, as commonly understood by a person skilled in the art. The wording used should not be considered as a limitation of the applicability of the present invention.

Benefits and advantages of the present embodiments comprise that a time instance for transmission and reception of HARQ feedback of the secondary system can be determined. Further, a UE can implement existing processing requirements on each of the radio accesses technologies according to some of the embodiments. The solution facilitates HARQ over multiple radio access technologies while still only implementing one radio access technology on the reverse (feedback) link, or UL or feedback channel.

Example Implementations

Network embodiments are now also briefly described. Clearly, there is a need to implement a receiver in a network node such as a radio-base station or NodeB/eNodeB for receiving the HARQ information according to the UE embodiments described above. In particular, there is a need for a receiver of uplink HARQ feedback information on a carrier associated with or implementing a primary system, where the receiver detects and decodes feedback information associated with a secondary system according to the timing described above. The radio-base station then conveys this feedback information to a transmitter of the secondary downlink system, which may be co-located in the same radio-base-station. Based on this feedback information, the transmitter then reveals if a re-transmission is needed or not. The radio base station may in any of the embodiments determine the time-instance for receiving HARQ feedback information, i.e. it may be e.g. the next subframe after the virtual timing instance, the closest in time, or the previous subframe (or TTI). The radio base station may also configure the UE or UEs such that only a subset of subframes or TTIs is available for receiving the aforementioned HARQ information. The radio base station may also configure and implement hysteresis values to determine the time instance for reception of feedback information.

Figure 8:
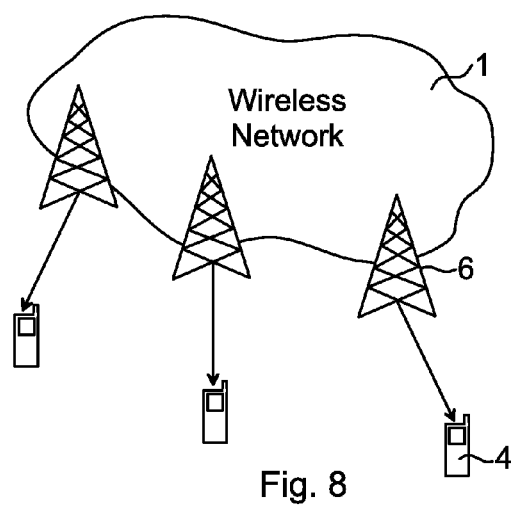
FIG. 8 illustrates schematically an environment, and in particular a communication system, in which embodiments of the invention may be implemented.

Although the described solutions may be implemented in any appropriate type of telecommunication system supporting any suitable communication standards and using any suitable components, particular embodiments of the described solutions may be implemented in a network (e.g., HSPA or LTE), such as that illustrated in FIG. 8.

As shown in FIG. 8, the example wireless communication network may include one or more instances of UEs 4 and one or more network nodes, such as base stations 6 capable of communicating with these UEs 4, along with any additional elements suitable to support communication between UEs 4 or between a UE 4 and another communication device (such as a landline telephone). Although the illustrated UEs 4 may represent communication devices that include any suitable combination of hardware and/or software, these UEs 4 may, in particular embodiments, represent devices such as the example UE 4 illustrated in greater detail by FIG. 9 or FIG. 7. Similarly, although the illustrated base stations 6 may represent network nodes that include any suitable combination of hardware and/or software, these base stations may, in particular embodiments, represent devices such as the example base station illustrated in greater detail by FIG. 10, which illustrates an exemplifying base station comprising means for implementing embodiments of the methods.

Figure 9:
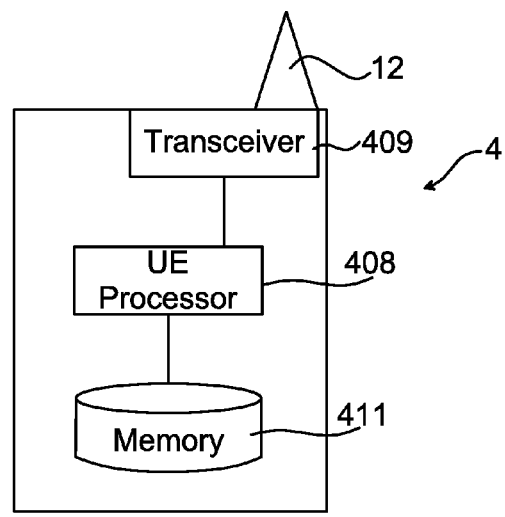
FIG. 9 illustrates schematically a user equipment suitable for implementing embodiments of the methods.

As shown in FIG. 9, the example UE 4 comprises a processor 408, a memory 411, a transceiver 409, and an antenna 412. In particular embodiments, some or all of the functionality described above as being provided by mobile communication devices or other forms of UE may be provided by the UE processor 408 executing instructions stored on a computer-readable medium, such as the memory 411 shown in FIG. 9. Alternative embodiments of the UE 4 may comprise additional components beyond those shown in FIG. 9 that may be responsible for providing certain aspects of the UE's functionality, including any of the functionality described above and/or any functionality necessary to support the solution described above.

Figure 10:
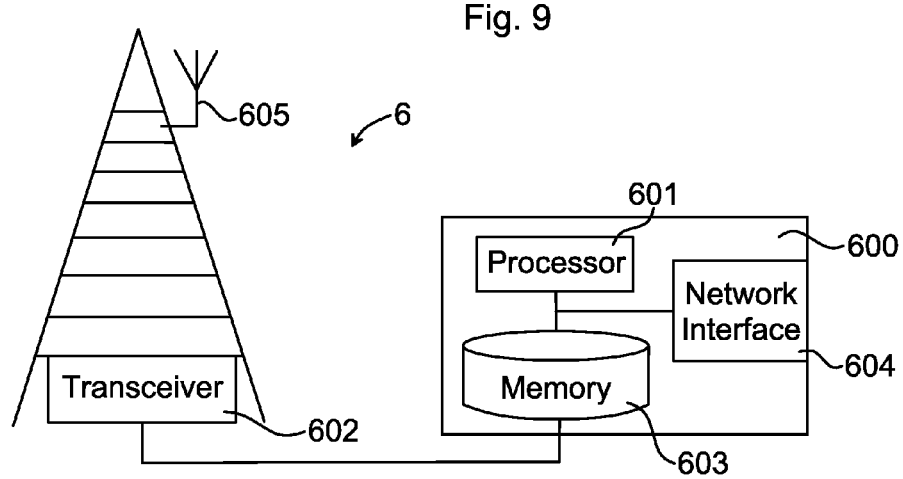
FIG. 10 illustrates an exemplifying network node or base station comprising means for implementing embodiments of the methods.

As shown in FIG. 10, the example network node, such as a base station 6 comprises an antenna 605 and a radio base station node 600, which in turn comprises a processor or processor circuit 601, a memory 603, and a transceiver 602. In particular embodiments, some or all of the functionality described above as being provided by a mobile base station, a base station controller, a node B, an evolved node B, and/or any other type of mobile communications node may be provided by the base station processor 601 executing instructions stored on a computer-readable medium, such as the memory 603 shown in FIG. 10.

In particular, a method may be implemented in the radio base station node 600 of a communication network 1 comprising a primary radio access technology system 2 and a secondary radio access technology system 3. The radio base station node 600 is arranged for communication with a user equipment 4 using the primary radio access technology system 2. The method comprises detecting feedback information associated with the secondary radio access technology system 3, and conveying the feedback information to a component of the secondary radio access technology system 3. An example of such component is a corresponding radio base station node (not illustrated) arranged for communication with the user equipment 4 using the secondary radio access technology system.

The invention thus also encompasses a network node such as a radio base station node 600 of a communication network 1, wherein the communication network 1 comprises a primary radio access technology system 2 and a secondary radio access technology system 3. The radio base station node 600 is arranged for communication with a user equipment 4 using the primary radio access technology system. The radio base station node 600 is arranged to detect feedback information associated with the secondary radio access technology system 3, and to convey the feedback information to a component of the secondary radio access technology system 3, e.g. a corresponding radio base station node (not illustrated) arranged for communication with the user equipment 4 using the secondary radio access technology system.

Alternative embodiments of the base station 6 may comprise additional components responsible for providing additional functionality, including any of the functionality identified above and/or any functionality necessary to support the solution described above.

The invention claimed is:

1. A method, in a user equipment, for determination of timing of a Hybrid Automatic Repeat re-Request (HARQ) response, the user equipment operating in a communication network comprising a primary radio access technology system and a secondary radio access technology system, the user equipment receiving data on at least one downlink carrier on the first radio access technology system and on at least one downlink carrier on the second radio access technology system, the user equipment transmitting the HARQ response on an uplink carrier of the first radio access technology system, the method comprising:

determining a downlink timing related to the secondary radio access technology system;
determining an uplink timing related to the primary radio access technology system; and
determining an uplink time instance for transmission of the HARQ response on the uplink carrier of the primary radio access technology system; and
wherein the HARQ response relates to data received on the downlink carrier on the secondary radio access technology system; and
wherein determining the uplink time instance for transmission of the HARQ response comprises determining the uplink time instance for transmission of the HARQ response based on an uplink timing for an HARQ response on the secondary radio access technology system and the downlink timing related to the secondary radio access technology system and setting the uplink time instance to the next uplink timing related to the primary radio access technology system.

2. The method of claim 1, wherein HARQ responses relating to two consecutive data packets are bundled onto one time instance for transmission on the uplink carrier of the primary radio access technology system.

3. The method of claim 2, wherein the HARQ response is transmitted only if both data packets are correctly decoded.

4. The method of claim 2, wherein the HARQ response is transmitted using a quadrature phase-shift keying (QPSK) constellation, where two points corresponding to one dimension is the HARQ response for one of the data packets and the other dimension is the HARQ response for the other packet.

5. The method of claim 1, further comprising applying a sequence of timings for HARQ responses for timing drifts less than a threshold value.

6. A user equipment configured to operate in a communication network comprising a primary radio access technology system and a secondary radio access technology system, the user equipment being configured to receive data on at least one downlink carrier on the first radio access technology system and at least one downlink carrier on the second radio access technology system, the user equipment transmitting a Hybrid Automatic Repeat re-Request (HARQ) response on an uplink carrier of the first radio access technology system, the user equipment comprising:

one or more processing circuits configured to:
determine a downlink timing related to the secondary radio access technology system;
determine an uplink timing related to the primary radio access technology system; and
determine an uplink time instance for transmission of the HARQ response on the uplink carrier of the primary radio access technology system;
wherein the HARQ response relates to data received on the downlink carrier on the secondary radio access technology system;
wherein the one or more processing circuits determine the uplink time instance for transmission of the HARQ response based on an uplink timing for an HARQ response on the secondary radio access technology system and the downlink timing related to the secondary radio access technology system and setting the uplink time instance to the next uplink timing related to the primary radio access technology system.

7. The user equipment of claim 6, wherein the one or processing circuits are configured to bundle HARQ responses relating to two consecutive data packets onto one time instance for transmission on the uplink carrier of the primary radio access technology system.

8. The user equipment of claim 7, wherein the one or processing circuits are configured to transmit the HARQ response only if both data packets are correctly decoded.

9. The user equipment of claim 7, wherein the one or processing circuits are configured to transmit the HARQ response using a quadrature phase-shift keying (QPSK) constellation, where two points corresponding to one dimension is the HARQ response for one of the data packets and the other dimension is the HARQ response for the other data packet.

10. The user equipment of claim 6, wherein the one or processing circuits are configured to apply a sequence of timings for HARQ responses for timing drifts less than a threshold value.

11. A method in a radio base station node of a communication network, the communication network comprising a primary radio access technology system and a secondary radio access technology system, the radio base station node being configured for communication with a user equipment using one downlink carrier and one uplink carrier on the primary radio access technology system, the method comprising:
  detecting feedback information associated with data transmissions on a downlink carrier of the secondary radio access technology system during communication with a user equipment using the uplink carrier of the primary radio access technology system;
  the detecting the feedback information associated with the secondary radio access technology system achieved by:
    determining a downlink timing related to the secondary radio access technology system;
    determining an uplink timing related to the primary radio access technology system; and
    determining an uplink time instance for reception of a Hybrid Automatic Repeat re-Request (HARQ) response on the uplink carrier of the primary radio access technology system;
  wherein the HARQ response relates to data transmitted on the downlink carrier on the secondary radio access technology system; and
  wherein the determining the uplink time instance for reception of the HARQ response comprises determining the uplink time instance for reception of the HARQ response based on an uplink timing for an HARQ response on the secondary radio access technology system and the downlink timing related to the secondary radio access technology system and setting the uplink time instance to the next uplink timing related to the primary radio access technology system.

12. A radio base station node of a communication network, the communication network comprising a primary radio access technology system and a secondary radio access technology system, the radio base station node being arranged for communication with a user equipment using one downlink carrier and one uplink carrier on the primary radio access technology system, the radio base station comprising:
  one or more processing circuits configured to:
    detect feedback information associated with data transmissions on a downlink carrier of the secondary radio access technology system during communication with a user equipment using the uplink carrier of the primary radio access technology system;
    wherein the detection of the feedback information associated with the secondary radio access technology system is achieved by:
      determining a downlink timing related to the secondary radio access technology system;
      determining an uplink timing related to the primary radio access technology system; and
      determining an uplink time instance for reception of a Hybrid Automatic Repeat re-Request (HARQ) response on the uplink carrier of the primary radio access technology system;
    wherein the HARQ response relates to data transmitted on the downlink carrier on the secondary radio access technology system; and
    wherein the one or more processing circuits determine the uplink time instance for reception of the HARQ response based on an uplink timing for a HARQ response on the secondary radio access technology system and the downlink timing related to the secondary radio access technology system and setting the uplink time instance to the next uplink timing related to the primary radio access technology system.

* * * * *

UNITED STATES PATENT AND TRADEMARK OFFICE
CERTIFICATE OF CORRECTION

PATENT NO. : 9,717,070 B2
APPLICATION NO. : 14/003964
DATED : July 25, 2017
INVENTOR(S) : Lindoff et al.

It is certified that error appears in the above-identified patent and that said Letters Patent is hereby corrected as shown below:

On the Title Page

Item (57), under "ABSTRACT", in Column 2, Line 3, delete "re-Request," and insert -- Request, --, therefor.

In the Drawings

In Fig. 3, Sheet 3 of 10, delete "HS-DSCH" and insert -- HS-PDSCH --, therefor.

In Fig. 3, Sheet 3 of 10, delete "Uplink DPCH" and insert -- Uplink DPCCH --, therefor.

In Fig. 9, Sheet 10 of 10, delete Tag "12" and insert Tag -- 412 --, therefor.

In the Specification

In Column 2, Line 33, delete "RATS" and insert -- RATs --, therefor.

In Column 3, Line 27, delete "RATS" and insert -- RATs --, therefor.

In Column 3, Line 41, delete "re-Request," and insert -- Request, --, therefor.

In Column 4, Line 36, delete "re-Request," and insert -- Request, --, therefor.

In Column 7, Line 8, delete "HS-SSCH/HS-PDSCH" and insert -- HS-SCCH/HS-PDSCH --, therefor.

In Column 7, Line 13, delete "RATS" and insert -- RATs --, therefor.

In Column 9, Line 22, delete "Interval TTI," and insert -- Interval (TTI), --, therefor.

In Column 9, Lines 38-39, delete "HS_DPCCH" and insert -- HS-DPCCH --, therefor.

Signed and Sealed this
Fifth Day of December, 2017

Joseph Matal
*Performing the Functions and Duties of the
Under Secretary of Commerce for Intellectual Property and
Director of the United States Patent and Trademark Office*

CERTIFICATE OF CORRECTION (continued)
U.S. Pat. No. 9,717,070 B2

In Column 10, Line 35, delete "AC/NAK" and insert -- ACK/NAK --, therefor.

In Column 11, Line 13, delete "RATS" and insert -- RATs --, therefor.

In the Claims

In Column 13, Line 58, in Claim 1, delete "re-Request" and insert -- Request --, therefor.

In Column 14, Line 43, in Claim 6, delete "re-Request" and insert -- Request --, therefor.

In Column 14, Line 65, in Claim 7, delete "one or" and insert -- one or more --, therefor.

In Column 15, Line 3, in Claim 8, delete "one or" and insert -- one or more --, therefor.

In Column 15, Line 6, in Claim 9, delete "one or" and insert -- one or more --, therefor.

In Column 15, Line 13, in Claim 10, delete "one or" and insert -- one or more --, therefor.

In Column 15, Line 37, in Claim 11, delete "re-Request" and insert -- Request --, therefor.

In Column 16, Line 30, in Claim 12, delete "re-Request" and insert -- Request --, therefor.